Oct. 17, 1950     R. G. SCHULER     2,525,957
PROJECTION SYSTEM

Filed Feb. 9, 1948     4 Sheets-Sheet 1

INVENTOR
REGINALD G. SCHULER
BY Emery Robinson
ATTORNEY

Oct. 17, 1950 — R. G. SCHULER — 2,525,957
PROJECTION SYSTEM
Filed Feb. 9, 1948 — 4 Sheets-Sheet 2
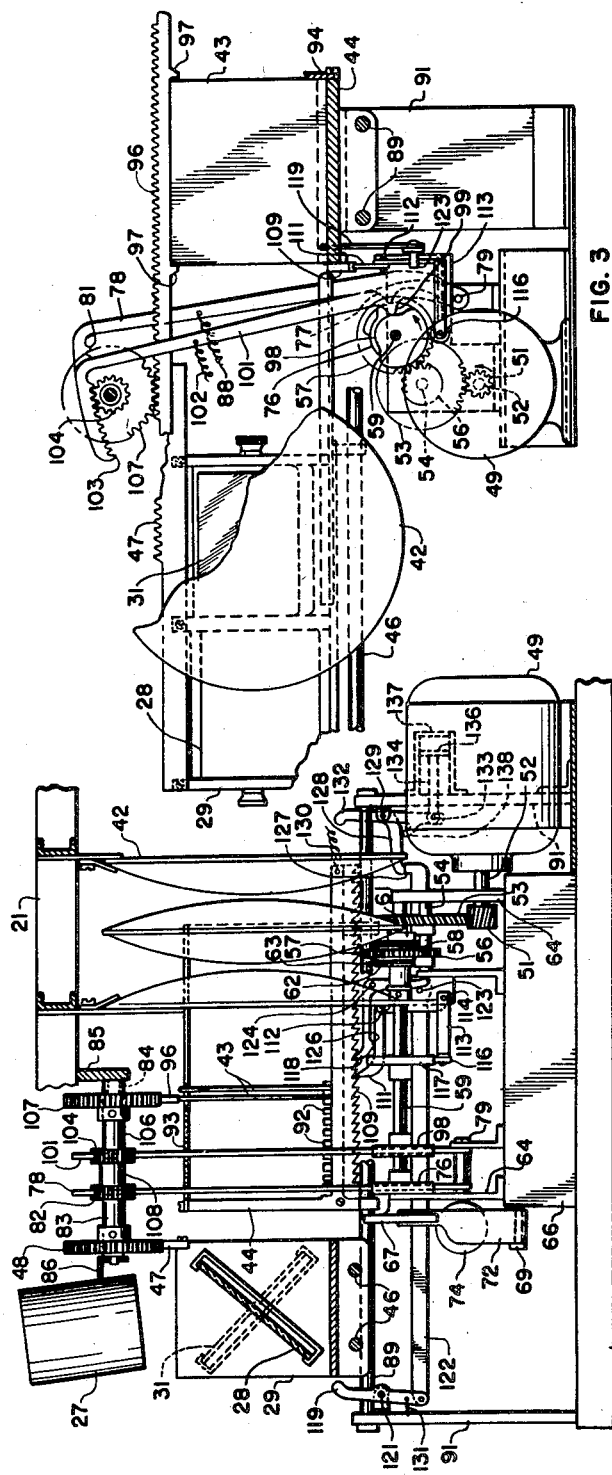
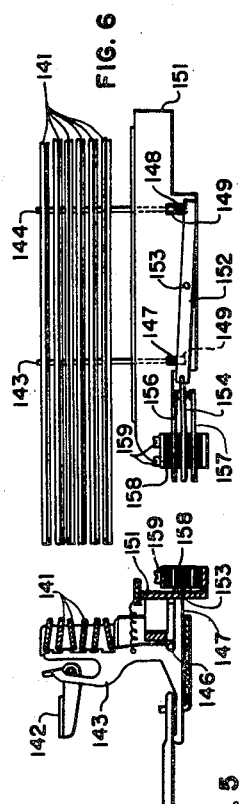
INVENTOR
REGINALD G. SCHULER
BY Emery Robinson
ATTORNEY

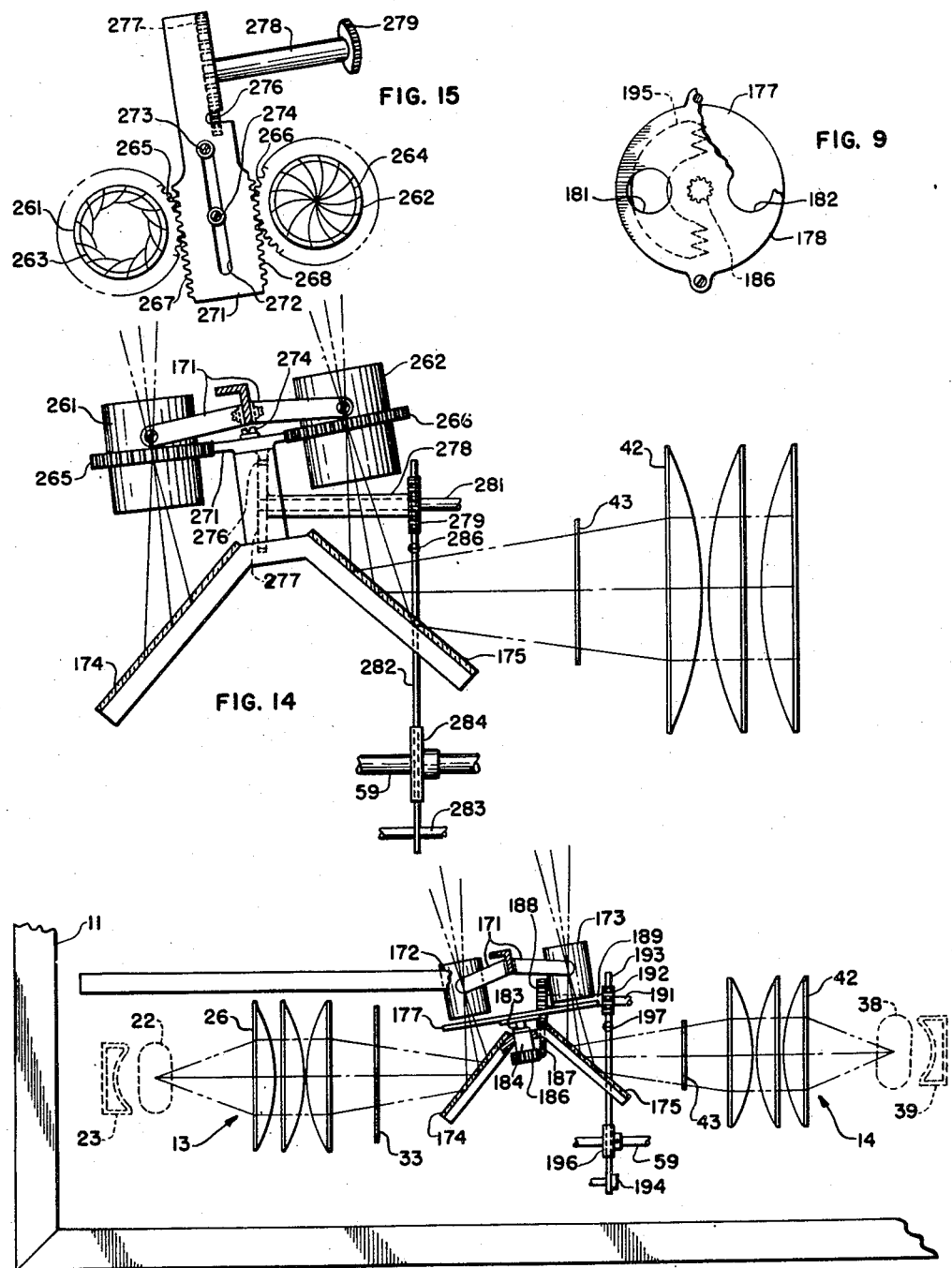

Oct. 17, 1950 R. G. SCHULER 2,525,957
PROJECTION SYSTEM
Filed Feb. 9, 1948 4 Sheets-Sheet 4
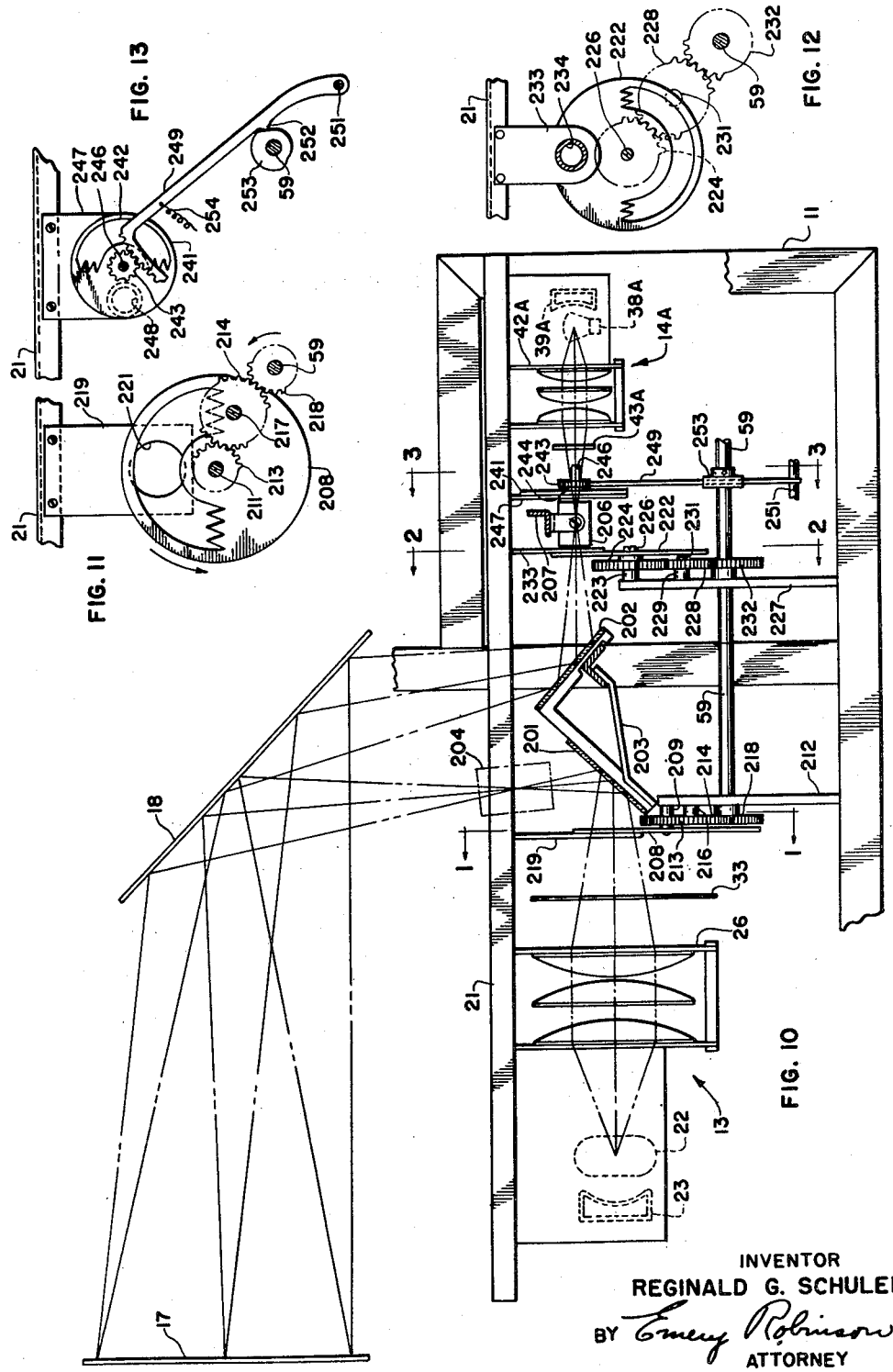
INVENTOR
REGINALD G. SCHULER
BY Emery Robinson
ATTORNEY Patented Oct. 17, 1950

2,525,957

UNITED STATES PATENT OFFICE 2,525,957

PROJECTION SYSTEM

Reginald G. Schuler, Crystal Lake, Ill., assignor to Teletype Corporation, Chicago, Ill., a corporation of Delaware Application February 9, 1948, Serial No. 7,256

6 Claims. (Cl. 88—24)

This invention relates to display apparatus and more particularly to combined news and advertising projectors.

In the present invention an advertising or pictorial display device is used alternately with a printing telegraph machine. News items received on a telegraph printer, preferably of the page type, are printed on a suitable recording medium which is advanced into the field of a projector. The projector field is large enough so that several lines of printed material may be projected upon a suitable screen, the printed record being advanced through the projector field in a stepped manner by the line feed mechanism on the telegraph printer. When the end of a certain news item or group of news items is reached a special signal is transmitted by the transmitting station, which signal actuates a special function lever in the receiving printer to break the circuit to a first magnet and make the circuit to a second magnet. The two magnets control a mechanism which renders the news projector inoperable and actuates an advertising projector. Transmission of a second special signal by the transmitting station actuates a second special function lever in the receiving printer to break the circuit to the second magnet and make the circuit to the first magnet, thereby stopping the advertising projector and again actuating the news projector.

Provision is also made in this invention for changing the advertising displays projected upon the screen between the news items. To accomplish this a rack is provided for accommodating a number of advertising slides. Whenever the advertising projector is actuated one of the slides is moved into the field of the projector, and thereafter when the news projector is again actuated this slide is moved out of the field of the projector and the rack is advanced a step so that the image of the next slide will be projected upon the screen when the advertising projector is again actuated. When the rack has been stepped to the position where the images of all of the slides contained therein have been projected upon the screen a mechanism is actuated for returning the rack to its original position and each of the slide images is against projected successively upon the screen.

One of the objects of the invention is to provide a display apparatus wherein a news projector and an advertising projector are combined and are alternately operable whereby news items or advertising material may be projected on a common screen.

Another object of the invention is to provide a combined news and advertising projector under the control of the station transmitting the news items.

Still another object of the invention is to provide a combined news and advertising projector wherein a printing telegraph receiver for receiving the news items is provided with means responsive to special telegraph signals for rendering either the news projector or the advertising projector operable.

A further object of the invention is to provide a combined news and advertising projector wherein news items may be typed by a printing telegraph receiver while advertising is being displayed.

A still further object of the invention is to provide a combined news and advertising projector wherein a different advertising display is automatically projected on the screen with each actuation of the advertising projector.

Yet another object of the invention is to provide a combined news and advertising projector wherein the advertising display may be changed by remote control.

These and other objects and advantages will appear from the following detailed description when read in conjunction with the accompanying drawings in which:

Fig. 2 is a detail view of a portion of the advertising projector shown in Fig. 1;

Fig. 3 is a side elevational view of the details shown in Fig. 2;

Fig. 5 is a detail view of one of the function levers responsive to special signals for closing the contacts in the projector control circuit;

Fig. 6 is a side elevational view of the details shown in Fig. 5;

Fig. 8 is a fragmentary side elevational view showing a modified form of the invention;

Fig. 9 is a detail view of a vignette disc used in the modification shown in Fig. 8;

Fig. 10 is a fragmentary side elevational view showing the modification shown in Fig. 8 as applied to a combined news and advertising projector wherein the advertising slide is of a size such as that from a small camera;

Fig. 11 is a sectional view taken substantially along the line 1—1 in Fig. 10;

Fig. 12 is a sectional view taken substantially along the line 2—2 in Fig. 10;

Fig. 13 is a sectional view taken substantially along the line 3—3 in Fig. 10;

Fig. 14 is a fragmentary elevational view of a second modification of the invention; and Fig. 15 is a detail view of the irises in the objective lenses shown in Fig. 14.

Figures 1, 4, 7:
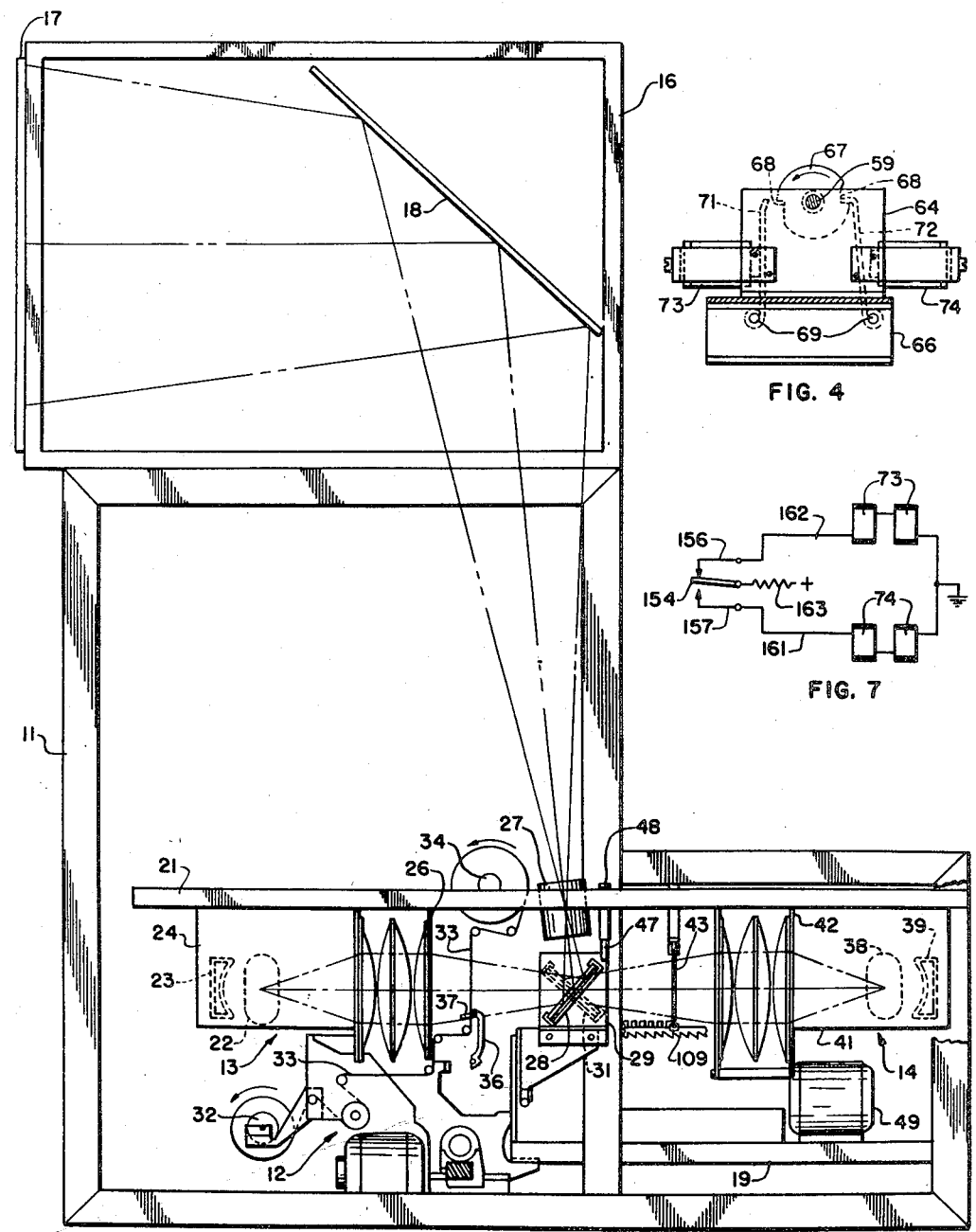
Fig. 1 is a side elevational view showing broadly the main embodiment of the invention.
Fig. 4 is a detail view of the mechanism for actuating the different projectors.
Fig. 7 is a diagram of the projector control circuit.

For a complete understanding of this invention reference should be had to U. S. Patent No. 1,904,164 issued to Morton et al., April 18, 1933, showing a telegraph printer of the page type suitable for purposes of this invention. Only such parts of the printer shown in the Morton et al. patent are referred to in the following description or shown in the accompanying drawings as are deemed necessary to facilitate an understanding of the features and operation of the present invention.

In the drawings a lower compartment 11 houses a printing telegraph receiver 12, news projector indicated generally by reference numeral 13, and an advertising projector indicated generally by reference numeral 14. An upper compartment 16, suitably secured to the lower compartment 11, has a viewing screen 17 at one side thereof and houses a suitably mounted reflecting mirror 18. A pair of supports 19 and 21 are mounted securely within the lower compartment 11 to provide support for the various parts enclosed within the lower compartment.

The news projector 13 has a suitable light source 22 and reflector 23 mounted within a housing 24 secured to the support 21. A condenser lens system 26 of the news projector 13 is secured to the support 21 and an objective lens system 27 mounted suitably within the lower compartment 11 is common to both the news projector 13 and the advertising projector 14. A mirror 28 for reflecting the image from the news projector 13 is mounted within a carriage 29 which also encloses a reflecting mirror 31 for reflecting the advertising image towards the common objective lens system 27.

The printing telegraph receiver 12 has a supply roller 32 on which a transparent recording form or tape 33 is rolled. From the supply roller 32 the transparent tape 33 follows an obvious path (Fig. 1) over a plurality of unnumbered guide rollers to a take-up roller 34. The transparent tape 33, in its path of travel, passes through the field of the news projector 13 in the image plane thereof which insures that a clear image of the news item on the tape 33 will appear on the screen 17. The transparent tape 33 is advanced by the line feed mechanism of the telegraph printer 12 in a stepped manner through the news projector field, the roller 34 holding the tape 33 in a taut condition at all times in order to prevent distortion of the image on the screen 17 due to curvature of the tape from the image plane. The type bars of printer 12 are represented by a single type bar 36 which strikes a platen 37 to print the message on the transparent tape 33.

The advertising projector 14 has a light source 38 and a reflector 39 mounted within a suitable housing 41. The advertising projector 14 is provided with a condenser lens system 42 which is secured to the support 21. A series of advertising slides 43 are positioned in a movable carriage 44 from which they are moved sequentially into the image plane of the advertising projector field.

The carriage 29, within which the two reflecting mirrors 28 and 31 are mounted, is slidable longitudinally on a pair of rods 46 so that either one of the mirrors may be moved into alignment with the objective lens system 27 in order to reflect either the image of the news items or the advertising display to the screen 17. The carriage 29 is provided with a rack 47 which cooperates with a pinion 48 to accomplish the above described moving of the carriage 29.

A continuously operating motor 49 is secured to the support 19 and has a gear 51 mounted on its shaft 52. The gear 51 meshes with a gear 53 on a shaft 54, and another gear 56 on the shaft 54 in turn meshes with a gear 57 secured to a sleeve 58 which comprises the drive member of a friction clutch. The sleeve 58 is rotatable around a shaft 59 to which is pinned a pair of sleeves 61 having flanges 62 thereon which comprise the driven member of the friction clutch. Between the ends of the sleeve 58 and the flanges 62 there are positioned a pair of felt friction washers 63 which allow the sleeve 58 to rotate relative to the sleeves 61 when the shaft 59 is prevented from rotating, but which supply sufficient friction between the sleeve 58 and flanges 62 to allow the sleeves 61 to be driven when the shaft 59 is not prevented positively from rotating. The shaft 59 is journalled in a pair of brackets 64 mounted fixedly on a support plate 66 which is secured to the support 19.

The details of the mechanism for controlling the rotation of the shaft 59 are shown in Fig. 4. The shaft 59 has secured thereto a cam disc 67 having a pair of locking notches 68 in the periphery thereof disposed diametrically opposite one another. Mounted pivotally by bolts 69 for cooperation with the locking notches 68 are a pair of armatures 71 and 72 which are controlled respectively by a pair of magnets 73 and 74, mounted securely on the bracket 64. Suffice to say at this point that when one of the magnets 73 or 74 is energized the other is substantially simultaneously de-energized and vice versa, so that at all times one or the other of the magnets 73 or 74 will be pulling up its armature. Also the magnets 73 or 74 are somewhat slow to release so that both armatures 71 and 72 are pulled up momentarily. However the magnet which has been de-energized will release its armature before the shaft 59 completes 180° of its revolution.

Considering as normal the position of parts as shown in Fig. 4, the magnet 73 is at this time energized and the magnet 74 is de-energized. Subsequent energization of the magnet 74 causes it to pull up the armature 72 releasing the shaft 59 for rotation by the drive member or sleeve 58 of the friction clutch. Because the magnet 73 is somewhat slow to release, the armature 71 is not immediately released at the moment of energization of magnet 74 and de-energization of magnet 73, but instead is released a short time later engaging the opposite locking notch 68 upon the completion of 180° of rotation of the shaft 59.

A cam 76 secured to the shaft 59 cooperates with a follower 77 on a rack lever 78 mounted pivotally on a bolt 79 secured to the bracket 64. The rack lever 78 has a toothed portion 81 thereon which cooperates with a pinion 82. The pinions 82 and 48 are secured to a sleeve 83 which is freely rotatable on a shaft 84 journalled in a pair of brackets 85 and 86 secured to the support 21. When the shaft 59 is in the position shown in Fig. 4 the high side of the cam 76 is opposite the follower 77. When the shaft 59 is released for a half revolution due to the energization of magnet 74 and de-energization of magnet 73, the follower 77 rides off the high portion of the cam 76 to the low portion thereof. At this time a tension spring 88 pivots the rack lever 78 counterclockwise (Fig. 3) to rotate the pinion 82 which in turn causes the rack 47 and carriage 29 to move to the right bringing the mirror 28 in line with the objective lens system 27. A subsequent rotation of the shaft 59 through a second 180° causes the follower 77 to ride from the low part of the cam 76 to the high part thereof which pivots the rack lever 78 clockwise to effectuate a leftward movement of the mirror carriage 29 (Fig. 3), thus bringing the mirror 31 back to the position shown in Fig. 3 in alignment with the objective lens system 27.

The movable carriage 44 is slidable longitudinally along a pair of rods 89 which rods are mounted securely in a pair of brackets 91. The carriage 44 has a series of dividers 92 on the base thereof and a comb plate 93 at the top. The slides 43 are adapted to slide in the slots in the comb plate 93 and between the dividers 92. A stop plate 94 bolted to the carriage 44 maintains the slides 43 in proper longitudinal alignment within the carriage 44.

A rack 96, having a pair of lugs 97 protruding therefrom is slidable longitudinally to move the slide 43, which is aligned with the image plane of the advertising projector, into a position aligned with the condenser lens system 42. The rack 96 is moved in this manner to bring the selected slide 43 into the image plane of the advertising projector slightly later than but during the same half revolution of the shaft 59 that the mirror 31 is moved into reflecting position behind the condenser lens system 42.

Following is a description of the mechanism for moving the rack 96. A cam 98, secured to the shaft 59, cooperates with a follower 99 on a rack lever 101 pivoted on the bolt 79. The rack lever 101 is biased by a spring 102 in order to hold the follower 99 against the cam 98. The rack lever 101 has a toothed portion 103 which cooperates with a pinion 104 secured to a sleeve 106 rotatable on the shaft 84. Secured to the other end of the sleeve 106 is a pinion 107. A spacer sleeve 108 maintains the pinions 82 and 104 and sleeves 83 and 106 in proper spaced relation on the shaft 84. The pinion 107 cooperates with the rack 96. When the shaft 59 rotates through the first half revolution from the position thereof shown in Fig. 4 the follower 99 moves from the high part of the cam 98 to the low part thereof and the spring 102 urges the rack lever 101 counterclockwise (Fig. 3) to rotate the pinions 104 and 107 counterclockwise to move the rack 96 to the right. During the next half revolution of the shaft 59, the follower 99 moves to the high part of the cam 98 resulting in a movement of the rack 96 to its leftward position whereby one of the slides 43 is carried to the left due to the action of the lugs 97 cooperating with such slide 43. The timing of the cams 98 and 76 is such that the slide 43 is positioned in the image plane of the advertising projector following the alignment of the advertising reflecting mirror 31 in reflecting position behind the condenser lens system 42. It should here be noted that the relative location of the high and low portions of the cams 76 and 98, as shown in Fig. 3 is distorted in order that both of the two rack levers 78 and 101 may be shown. When the cam 76 is in the position shown, with the follower 77 on the high part of cam 76, the follower 99 is also on the high part of cam 98 and the slide carriage 44 and mirror 31 are properly aligned in order that the image of the advertisement on the slide 43 is projected on the screen 17.

In order that the image of a different slide 43 will be projected on the screen 17 between projections of news items it is necessary to advance the slide carriage 44 one step during each complete revolution of the shaft 59 to bring a different slide 43 into alignment with the lugs 97 on the rack 96. The carriage 44 is provided with a ratchet 109 with which a stepping pawl 111 cooperates. The stepping pawl 111 is secured pivotally by a bolt 112 to a bell crank 113 pivoted at 114, and the bell crank 113 carries a follower roller 116. The roller 116 cooperates with a cam 117 secured to the shaft 59. When the cam 117 rotates such that the roller 116 moves from the low part of the cam 117 to the high part thereof, the bell crank 113 is pivoted counterclockwise about pivot point 114 to move the pawl 111 to the left (Fig. 2) in order to advance the ratchet 109 one step. The ratchet 109 having thus been advanced a step, a second pawl 118 which acts as a holding pawl engages another tooth on the ratchet 109 to hold it in its stepped position. Thereafter during the next half revolution of the shaft 59, the low part of the cam 117 presents itself to the roller 116 and a spring (not shown) on the bell crank 113 pivots the bell crank 113 clockwise to move the pawl 111 to the right preparing it for the next stepping operation. The high part of the cam 117 engages the roller 116 prior to the engagement of the high part of the cam 98 with the follower 99 insuring that the slide 43 will be aligned with the lugs 97 before the rack 96 is moved to position the slide 43 in the image plane of the advertising projector. The low part of the cam 117 presents itself opposite the roller 116 to return the pawl 111 to the right (Fig. 2) prior to the return of the rack 96 to the right (Fig. 3), however it is only essential that the pawl 111 be returned in time to complete its next subsequent stepping operation.

When the slide carriage 44 has been stepped to the position where the last slide 43 to the right in the carriage 44 has been moved into the image plane of the advertising projector, a subsequent stepping operation by the pawl 111 causes the carriage 44 to engage and pivot a lever 119 counterclockwise (Fig. 2) about its pivot bolt 121. A link 122 secured pivotally to the lever 119, and slidable longitudinally, has a pin 123 adapted to engage the depending arm of the pawl 118, pivoting the pawl 118 counterclockwise about a pivot bolt 124 to disengage the pawl 118 from the ratchet 109. The pawl 118 carries a lug 126 which, when the pawl 118 is pivoted from engagement with the ratchet 109 by the pin 114, engages the pawl 111 to also move it from engagement with the ratchet 109. The link 122 has a shoulder 127 which engages a pivotal locking lever 128 mounted pivotally by a bolt 129. When the link 122 is moved to the right due to engagement of the carriage 44 with the lever 119, the shoulder 127 is locked by the locking lever 128 and thus holds the pawls 111 and 118 from engagement with the ratchet 109 while the carriage 44 is returned to start position at the right under the urging of a spring 130. A blocking lever 132, also mounted pivotally on the bolt 129, is secured pivotally by a bolt 133 to a piston rod 134. A piston 136 is slidable within a cylinder 137, however sliding movement of the piston 136 is opposed by increased air pressure on the forward side of the piston 136 and by vacuum on the rearward side of the piston 136 within the cylinder 137. The cylinder 137 is provided with adjustable exhaust outlets at either end thereof in order that the air may escape and enter allowing the air pressure within the cylinder to slowly return to normal when it is increased or decreased due to movement of the piston 136. A projecting arm 138 on the lever 132 engages the lever 128 to cause disengagement of the lever 128 from the shoulder 127 whenever lever 132 is pivoted clockwise. Upon the return of the slide carriage 44 to the right or start position it strikes the lever 132 with considerable force. The resulting shock is absorbed by the air within the cylinder 137 due to the movement of the piston 136. Pivotal movement of the lever 132 causes the arm 138 to lift the locking lever 128 from locking engagement with the shoulder 127 and a spring 131 attached to the lever 119 moves the link 122 withdrawing the pin 123 from engagement with the depending arm of the pawl 118. Release of the pawl 118 also permits the pawl 111 to engage the ratchet 109 on the next normal stepping operation.

The interval of time required between the stepping of the carriage 44 to actuate the link 122 and associated mechanism and the return of the carriage 44 to its rightward position is less than the interval between the normal stepping of the carriage 44 and the actuation of the rack 96 to move the slide 43 into the image plane of the advertising projector 14. When the carriage 44 has returned to its start position it is so positioned that the rack 96, on its actuation immediately following, moves the slide 43, furthermost to the left in the carriage 44, into the image plane of the advertising projector.

There is shown in Figs. 5, 6 and 7 the mechanism for actuating the magnets 73 and 74 which determines which projector is to project its information upon the screen 17. It is apparent from Fig. 7 that either the circuit through the magnet 73 or that through 74 is closed at all times except while the switching operation is in progress.

A set of selector vanes 141 in the receiving telegraph printer 12 is permutably positioned in response to incoming signals from a distant transmitting station (not shown). After each permutation has been set up in the vanes 141 a function lever bail 142 pivots downwardly and allows a set of function levers, represented by function levers 143 and 144, to pivot clockwise about a pivot rod 146 to sense the vanes 141. When the permutation existing in the vanes 141 corresponds to one of the function levers 143 or 144, such function lever pivots further clockwise to perform its designated function.

The function levers 143 and 144 have forward extensions thereon, designated respectively by reference numerals 147 and 148, which extend through a pair of slots 149 in a front plate 151 of the receiving printer 12 to cooperate with a switching lever 152 pivoted at 153. When the function levers 143 or 144 are in unselected position the forward extensions 147 and 148 are held above the switching lever 152, but when either function lever 143 or 144 is selected, the forward extension 147 or 148 thereof pivots clockwise, moving the corresponding end of the switching lever 152. The switching lever 152 moves a swinger 154 to complete a circuit through either contact 156 or 157. A suitable detent (not shown) is provided to hold the switching lever 152 in either one of its two possible positions until actuated to its other position. The swinger 154 and the contacts 156 and 157 are insulated from one another and are mounted in an insulator block 158. Terminal screws 159 also are mounted in the insulator block 158, being suitably connected to the proper contacts 156 and 157 or swinger 154, to provide a convenient connection for leads 161 and 162 to magnets 74 and 73 respectively. When the switching lever 152 is in the position shown in Fig. 6 a circuit is closed (see Fig. 7) from positive battery, through a suitable resistance 163, swinger 154, contact 156, lead 162, magnet 73 to ground. When the switching lever 152 is pivoted counterclockwise by the forward extension 147 when the function lever 143 is selected the aforementioned circuit through the magnet 73 is opened and a circuit is established from positive battery, through the resistance 163, swinger 154, contact 157, lead 161, magnet 74 to ground. When the switching lever 152 is returned to the position shown in Fig. 6 the magnet 74 is de-energized and the magnet 73 is energized.

In operation the position of the parts as shown in the drawings (Figs. 1 through 7) is that position thereof for operation of the advertising projector 14, except that in Fig. 3 the slide 43 and rack 96 should be in their leftward positions and mechanism associated therewith correspondingly should be in its other position at this time instead of the positions thereof as shown. At this time the news projector 13 is inoperative to project its information on the screen 17 due to the position of the reflecting mirror 28 out of the focus line of the news projector 13. The printer 12 may or may not be printing a message on the tape 33 at this time.

Receipt of a signal from the distant station, in response to which the function lever 143 is actuated, causes the circuit to magnet 74 to be closed and the circuit to magnet 73 to be opened causing the rotation of the shaft 59 through 180°. Due to such rotation of the shaft 59, the slide 43 in the image plane of the advertising projector is moved back into position within the carriage 44 and the mirror carriage 29 is moved to the right in order to project the news item on the screen 17. If a subsequent signal is received in response to which the function lever 143 again performs its function, nothing happens as the switching lever 152 remains in whichever position it is moved until again moved by the other function lever 143 or 144. When the news projector is operating, receipt of a signal by the printer 12, in response to which the function lever 144 is actuated to perform its function, results in the release of the shaft 59 through a second 180°. Such rotation of the shaft 59 causes the carriage 44 to be advanced one step, the slide 43 to be moved into the image plane of the advertising projector, and the mirror 31 to be moved whereby the advertising projector is rendered operative.

In the following description of a modification of the invention like reference numerals are used to indicate parts identical with those already described and only such parts are shown in the drawings as are deemed necessary to adequately differentiate such modification from the first embodiment of the invention.

Referring to Fig. 8 the lower compartment 11 houses the news projector 13 having the light source 22, reflector 23, and condenser lens system 26. Only the portion of the transparent recording form or tape 33 which lies in the image plane of the news projector 13 is shown. The advertising projector 14 is represented by its light source 38, reflector 39, and condenser lens system 42, and only the slide 43 is shown which is positioned in the image plane of the advertising projector 14. The mechanism for changing the slides 43 in this embodiment is identical with that already described. A pair of supporting arms 171 mounts securely a pair of objective lens systems 171 and 172 which are parts of the news and advertising projectors 13 and 14 respectively. A pair of reflecting mirrors 174 and 175 are rigidly mounted within the lower compartment 11 and respectively form parts of the news and advertising projectors 13 and 14.

A vignette disc 177 is enclosed suitably in a housing 178 secured within the lower compartment 11. The housing 178 has a pair of apertures 181 and 182 diametrically opposite one another positioned respectively in alignment with the objective lens systems 172 and 173. The vignette disc 177 is rotatable within the housing 178 and is secured to a shaft 183 rotatable within a sleeve 184. A pinion 186, secured to the shaft 183, cooperates with a set of teeth on a rack 187, the rack 187 having a second set of teeth thereon cooperating with a pinion 188. The pinion 188 is secured to a sleeve 189 which is rotatable on a shaft 191 and a second pinion 192 secured to the sleeve 189 cooperates with a rack lever 193 which is similar to the rack levers 78 and 101 already described. The rack lever 193 is mounted pivotally on a bolt 194 and a follower (not shown) on the rack lever 193 is continuously urged against a cam 196 on the shaft 59 by a spring 197.

The vignette disc 177 has a transparent section 195 the width of which is substantially equal to the diameter of the apertures 181 or 182 and the arcuate length of which covers approximately 180° of the vignette disc 177. The arcuate transparent section 195 is positioned radially in the vignette disc 177 aligned with the apertures 181 or 182. When the vignette disc 177 is in a stopped position the approximate center of the transparent section 195 is aligned with one of the apertures 181 or 182. When the shaft 59 is rotated through a half revolution in response to signals received by the printing receiver, the rack lever 193 in oscillating, rotates the pinion 192 which rotation is transferred to the pinion 188 to move the rack 187. Movement of the rack 187 causes the pinion 186 to rotate the vignette disc 177 allowing one of the projectors to operate and preventing operation of the other projector. Subsequent rotation of the shaft 59 through a second half revolution returns the projectors to the former condition.

Referring now to Fig. 10, a combined news and advertising projector is shown wherein the advertising slides are relatively quite small such as those from a small camera. In this case the advertising projector 14A is a miniature of the advertising projector 14 and in order to enlarge the image projected on the screen 17 the objective lens system of the advertising projector is brought nearer to the image plane of the advertising projector 14A.

The lower compartment 11 houses the news projector 13 represented by the light source 22, reflector 23, condenser lens system, and the portion of transparent tape 33 within the news projector field. The miniature advertising projector 14A is represented by the light source 38A, reflector 39A, condenser lens system 42A and a single miniature slide 43A. A pair of reflecting mirrors 201 and 202, respectively, parts of the news projector 13 and advertising projector 14A, are mounted on a mirror frame 203 mounted suitably in the lower compartment 11. An objective lens system 204 is provided for the news projector 13 and an objective lens system 206, mounted on a suitable support 207 within the lower compartment 11, is provided for the advertising projector 14A. The light rays from both projectors are ultimately reflected by the reflecting mirror 18 to the screen 17.

The mechanism for determining which of the two projectors 13 or 14A is to be operable is identical with the mechanism previously described which is responsive to special signals transmitted by the distant telegraph transmitter. For controlling the operation of the news projector a vignette disc 208 is secured to a sleeve 209 which together are rotatable about a shaft 211 secured to a support 212. A gear 213 is also secured to the sleeve 209 and meshes with an intermediate gear 214 secured to a sleeve 216 rotatable about a shaft 217 also secured to the support 212. The intermediate gear 214 meshes with a gear 218 secured to the shaft 59 which is rotated through half revolutions in response to signals transmitted by the distant transmitter. A plate 219, secured to the support 21, has an aperture 221 therein which is aligned with the image projected by the news projector 13 and together with the cooperating vignette disc 208 controls the operation of the news projector 13. The vignette disc 208 is constructed like the vignette disc 177, already described, and cooperates with the aperture 221 to render the news projector 13 and advertising projector 14A operable alternately.

A vignette disc 222 similar to the vignette disc 208, is provided, for controlling the operation of the advertising projector 14A and is secured to a sleeve 223 to which is also secured a gear 224, the sleeve 223 being rotatable about a bolt 226 secured to a support 227. The gear 224 meshes with an intermediate gear 228 on a sleeve 229 rotatable on a bolt 231 secured to the support 227. The intermediate gear 228 meshes with a gear 232 secured to and rotatable with the shaft 59. A plate 233, secured to the support 21, has an aperture 234 therein which is aligned with the image projected by the advertising projector 14A and cooperates with the vignette disc 222 to control the operation of the advertising projector 14A.

It should be noted at this point that the gears 224 and 232 are of the same diameter and likewise, the gears 213 and 218 are the same size which insure that a half revolution of the shaft 59 will cause the vignette discs 222 and 208 to rotate a half revolution. The transparent sections of the vignette discs 208 and 222 are, at all times, positioned 180° from one another which insures that one, and only one, of the projectors will project its image on the screen 17.

An alternate means for controlling the operation of the advertising projector 14A is shown in detail in Fig. 13. A vignette disc 241 of the type already referred to, having a transparent section 242 of arcuate length of approximately 180°, and a gear 243 are both secured to a sleeve 244 which is rotatable about a shaft 246. A plate 247 is secured to the support 21 and mounts rigidly the shaft 246. The plate 247 also has an aperture 248 therein which cooperates with the vignette disc 241 to control the operation of the advertising projector 14A in a manner like that already described. The vignette disc 241 is rotated by a rack lever 249 mounted pivotally on a shaft 251, which rack lever 249 has a follower 252 which is continuously urged by a spring 254 against a cam 253 secured to the shaft 59. In the normal stop position of the shaft 59 the follower 252 is positioned on the lower half of the cam 253 as shown. Subsequent rotation of the shaft 59, in response to a signal from the distant transmitting station, through a half revolution, causes the follower 252 to travel to the high part of the cam 253, pivoting the rack lever 249 clockwise and rotating the gear 243 and vignette disc 241 counterclockwise to move the transparent section 242 into alignment with the aperture 248. Therefore at this time the advertising projector is operable. During this first half revolution of the shaft 59 the vignette disc 208 will have been rotated to the point where the opaque section of the vignette disc 208 is aligned with the aperture 221 in the plate 219 and the news projector 13 is thereby rendered inoperable. Rotation of the shaft 59 through a second half revolution results in the clockwise rotation of the vignette disc 241 until the opaque section thereof is aligned with the aperture 248 to render the advertising projector 14A inoperable and the vignette disc 208 is moved to the position where the news projector 13 is operable.

Figs. 14 and 15 show a pair of objective lens systems each of which is provided with an iris or shutter for controlling the projection from the respective projector. Only the parts are shown in Figs. 14 and 15 which are different from those which have previously been described, or which are deemed necessary for a complete understanding of this modification of the invention.

The mirrors 174 and 175 are provided for reflecting the images from the news and advertising projectors 13 and 14 respectively. The condenser lens system 42 of the advertising projector and one of the advertising slides 43 are also shown in Fig. 14. A pair of objective lens systems 261 and 262 are suitably mounted by the supporting arms 171. The objective lens systems 261 and 262 are provided respectively with irises or shutters 263 and 264 which may be closed or opened by rotation. The irises 263 and 264 are formed integrally with peripheral gears 265 and 266 which coact respectively with toothed portions 267 and 268 on a rack 271. The rack 271 has an elongated slot 272 by means of which the rack is slidable longitudinally on a pair of bolts 273 and 274 secured suitably within the lower compartment 11. The rack 271 has another toothed portion 276 which cooperates with a pinion 277 mounted on a rotatable sleeve 278. The sleeve 278 carries another pinion 279 and is rotatable on a shaft 281 mounted fixedly within the lower compartment 11. A rack lever 282 is mounted pivotally on a shaft 283 and when pivoted engages the pinion 279. The rack lever 282 carries a follower (not shown) which is continuously urged against a cam 284 mounted on the shaft 59 by a spring 286.

When the shaft 59 is released for a half revolution the rack lever 282 pivots to rotate the sleeve 278. Rotation of the sleeve 278 causes the rack 271 to be moved by the pinion 277 which in turn rotates the two gears 265 and 266. As the rack lever 282 is pivoted due to its follower riding up the high portion of the cam 284 the iris or shutter 263 is closed and the iris or shutter 264 is opened to render the advertising projector operable. During the second half revolution of the shaft 59 the follower on the rack lever 282 moves from the high part to the low part of the cam 284 causing the gear 265 to be rotated clockwise and the gear 266 to be rotated counterclockwise to open the iris 263 and close the iris 264 thus rendering the news projector operable.

Various other changes and modifications may be made in the invention without departing from the spirit thereof.

What is claimed is:

1. In a telegraphically controlled projecting apparatus, a telegraph printer for producing a printed record, a screen, a projector for projecting an image of said printed record upon said screen, a plurality of advertising slides each adapted to be moved to projection position, an advertising projector for projecting upon said screen an image of the one of said plurality of advertising slides in projection position, means in said telegraph printer responsive to special signals transmitted by a distant transmitting station for causing said projectors to be operable alternately, a carriage for supporting said plurality of advertising slides, a ratchet on said carriage, a pawl operable when said advertising projector is rendered operable for stepping said carriage, a rack for moving one of said plurality of slides into projection position, and a pinion for actuating said rack when said carriage has been stepped, said pawl and ratchet cooperating with said rack and pinion to bring successive slides into projection position.

2. In a telegraphically controlled projecting apparatus, a telegraph printer for producing a printed record, a screen, a projector for projecting an image of said printed record upon said screen, a plurality of advertising slides each adapted to be moved to projection position, an advertising projector for projecting upon said screen an image of the one of said plurality of slides in projection position, a pair of function levers in said telegraph printer operable in response to special signals received by said telegraph printer for controlling the energization and de-energization of a pair of electromagnetic circuits, an electromagnet in each of said electromagnetic circuits, said electromagnets being effective to cause the alternate operation of said projectors, a carriage for supporting said plurality of advertising slides, means operable when said advertising projector is rendered operable for stepping said carriage, and means operable when said carriage is stepped for moving one of said plurality of slides into projection position, said carriage stepping means and said slide moving means cooperating to bring successive slides into projection position.

3. In a display apparatus, a telegraph printer for producing a printed record, a screen, a first reflector, a projector for projecting an image of said printed record to said reflector whereby the image is reflected to said screen, an advertising slide, a second reflector, a second projector for projecting an image of said advertising slide to said second reflector, said second reflector reflecting the image of said advertising slide to said screen, a carriage for mounting said reflectors movable to either of two positions, said reflectors being mounted on said carriage whereby said first reflector is effective when said carriage is in one position and said second reflector is effective when said carriage is in the other position, a rack on said carriage, a pinion cooperating with said rack, means for actuating said pinion whereby said pinion cooperates with said rack to move said carriage to either of said positions, and means in said telegraph printer responsive to special signals received by said telegraph printer for rendering said pinion actuating means effective to cause said rack and pinion to move said carriage alternately from one position to the other.

4. In a display apparatus, a telegraph printer for producing a printed record, a screen, a printed record projector for projecting an image of said printed record on said screen, a movable slide carriage having a ratchet integral therewith, a plurality of slides removably positioned within said carriage, a pawl for cooperation with said ratchet to step said slide carriage from a start position to bring successive ones of said slides into alignment with a projection position, means operable when said slide carriage has been stepped a predetermined distance for returning said slide carriage to said start position, means for moving the slide in alignment with said projection position into said projection position, a slide projector for projecting an image of said slide in projection position onto said screen, and means in said telegraph printer responsive to special signals received thereby for causing the alternate operation of said printed record projector and said slide projector, said pawl and ratchet cooperating to step said slide carriage and said slide moving means operating to move said slide in alignment with said projection position when said slide projector is rendered operable.

5. In a display apparatus, a telegraph printer for producing a printed record, a printed record projector for projecting an image of said printed record on said screen, a plurality of slides, a movable carriage having said plurality of slides positioned therein, means for moving said carriage in a stepped manner from a start position to bring successive ones of said slides into a projection position, means operable when said slide carriage has been stepped a predetermined distance for returning said carriage to said start position, a projector for projecting an image of said slide in projection position upon said screen, and means in said telegraph printer responsive to special signals received thereby for causing the alternate operation of said printed record projector and said slide projector, said carriage moving means operating to step said carriage when said slide projector is rendered operable.

6. In a display apparatus, a telegraph printer for producing a printed record, a screen, a projector for projecting an image of said printed record upon said screen, a plurality of slides, means for moving successive ones of said slides individually into projection position, a slide projector for projecting an image of the slide in projection position upon said screen, a pair of iris shutters for controlling the operation of said projectors, gear means on each of said iris shutters, rack means cooperating with said gear means for actuating said iris shutters, and means in said telegraph printer controlled by special signals received by said telegraph printer for causing said rack means and gear means to actuate said iris shutters to cause said projectors to be operable alternately, said slide moving means being operable to move a succeeding one of said slides into projection position whenever said slide projector is rendered operable.

REGINALD G. SCHULER.

REFERENCES CITED

The following references are of record in the file of this patent:

UNITED STATES PATENTS

| Number | Name | Date |
| --- | --- | --- |
| 590,903 | Newman | Sept. 28, 1897 |
| 941,752 | Ashley | Nov. 30, 1909 |
| 1,060,128 | Roebuck | Apr. 29, 1913 |
| 1,172,628 | Partington | Feb. 22, 1916 |
| 1,904,164 | Morton et al. | Apr. 18, 1933 |
| 1,969,440 | Wheeler et al. | Aug. 7, 1934 |
| 1,969,461 | Hewitt | Aug. 7, 1934 |
| 1,969,467 | Long et al. | Aug. 7, 1934 |
| 2,027,026 | Dirkes et al. | Jan. 7, 1936 |